Patented June 24, 1924.

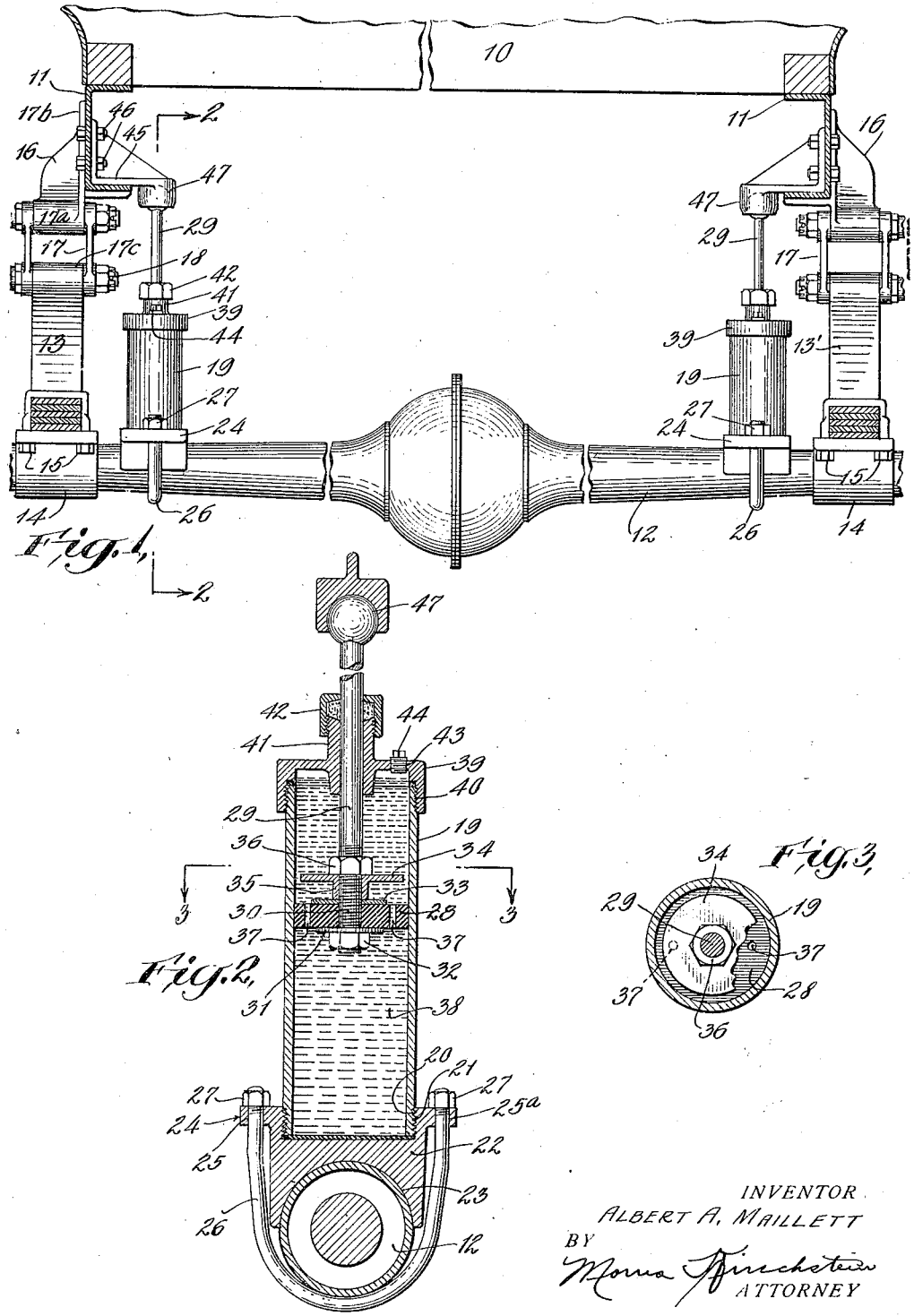

1,498,925

UNITED STATES PATENT OFFICE.

ALBERT A. MAILLETT, OF NEW YORK, N. Y.

SHOCK ABSORBER FOR MOTOR VEHICLES.

Application filed October 4, 1922. Serial No. 592,254.

*To all whom it may concern:*

Be it known that ALBERT A. MAILLETT, citizen of the United States, residing at the city of New York, in the county of Bronx and State of New York, has invented certain new and useful Improvements in Shock Absorbers for Motor Vehicles, of which the following is a specification.

This invention relates to shock absorbers for motor vehicles. One object thereof is to provide a device of the character described which shall be simple in construction, comparatively cheap to manufacture, and efficient in operation to a high degree.

Another object of the invention is to provide a device of the character described which may be readily assembled or disassembled and easily mounted on or dismounted from the vehicle.

Other objects of this invention will in part be obvious and in part hereinafter pointed out.

The invention accordingly consists in the features of construction, combinations of elements and arrangement of parts which will be exemplified in the construction hereinafter described and of which the scope of application will be indicated in the following claims.

In the accompanying drawings, in which is shown one of various possible illustrative embodiments of this invention, Fig. 1 is a rear end view partly in cross-section showing a pair of shock absorbers embodying my invention in position on the rear axle of an automobile, the body of the latter being shown only partially;

Fig. 2 is an enlarged mid-cross-sectional view of the shock absorber taken along line 2—2 of Fig. 1; and Fig. 3 is a detailed cross-sectional view taken along line 3—3 of Fig. 2.

Referring in detail to the drawing, 10 indicates the automobile body mounted on the chassis 11. 12 indicates the rear axle at each end of which is secured a leaf spring 13, 13' in any suitable manner. Thus, in the illustration shown in the drawing, the spring is connected to the rear axle 12 by means of a sleeve 14 and bolts 15, and at the other end to the side bar or bracket 16 of the vehicle. The connection to the latter may be made by means of a hanger 17 comprising an upper bearing member 17$^a$ having an attaching plate 17$^b$ whereby the same is rigidly connected to the side bar 16, and a lower bearing member 17$^c$ in which the other end of the leaf spring is pivotally secured by means of a bolt 18.

The shock absorber comprises a cylinder 19 threaded at the bottom as at 20 for a corresponding thread 21 on the attaching member 22. The latter is adapted to serve both to close the bottom of the cylinder and as means for attaching the shock absorber to the rear axle 12. To accomplish the latter purpose the member 22 is formed at the bottom thereof with a cylindrical recess 23 corresponding in shape and diameter to the portion of the rear axle adjacent the spring 13 so that the attaching member may fit snugly over the rear axle as shown in Fig. 2. The member 22 is provided at the top thereof with a flange 24 having diametrically opposed holes 25, 25$^a$ to receive the free ends of a strap 26 which extends underneath the axle and is firmly secured to said flange by means of nuts 27. Operating within the cylinder is a piston 28 of metal or any suitable material secured to a plunger 29. In the form shown in the drawing, the latter is threaded at its lower end as at 30 where it passes centrally through the piston 28. A washer 31 is provided at the lower surface of the piston and held tightly thereagainst by means of the nut 32 which holds the piston head to the plunger. A washer 33 is further provided on the top surface of the piston and disposed above said washer is a deflecting disc 34 having a tubular extension 35 through which the plunger 29 passes. A nut 36 serves to hold the deflecting disc 34 in position and forces the same against the washer 33. Openings or passages 37 are provided in the piston wherethrough the liquid 38 in the cylinder may be forced against the piston as the plunger moves downward. The cylinder is closed at the top by means of a cap 39 which is preferably threaded on the cylinder as at 40. The cap 39 is formed or provided with a central tubular extension 41 through which the plunger 29 passes. To make the plunger 29 water tight in the cylinder, a stuffing box 42 of any approved construction is provided. The cap 39 is provided with a small opening 43 adapted to be closed by a screw cap 44, wherethrough the cylinder may readily be filled. For attaching the shock absorber at the top thereof to the vehicle, a bracket 45 is secured to the chassis frame 11 as by means of the bolts and nuts 46 and the upper end of the plunger 29 is swiveled in said bracket by means of a ball and socket joint 47 or in any other suitable manner.

The liquid 38 may be of any suitable composition. Preferably I employ a mixture of glycerine and alcohol which I have found highly satisfactory for the purpose herein described.

The operation of the device will now be clear. As the vehicle passes over an uneven surface, the plunger 29 moves up or down, simultaneously with the upward or downward movement of the springs 13, 13'. Thus, when the wheels move into a depression in the road, the car body and rear axle moving downward, the plunger moves upward relatively to the cylinder and the sudden downward movement of the car is cushioned by the upward action of the piston head in the cylinder, compressing the liquid above the piston with the orifices 37. On the other hand, as the car moves out of the depression, the recoil of the springs 13, 13' is not sudden but made gradual by reason of a portion of the recoil energy being used up in counteracting the downward action of the piston, compressing the liquid below the piston head into the smaller volume of the orifices 37.

When the piston moves downward, the liquid rises above the piston head through the passages 37, but is momentarily confined between the upper surface of the piston head and the deflecting disc 34 and forced outward toward the walls of the cylinder, thus preventing a sudden upward pressure or rush of the liquid.

It will thus be seen that there is provided a device in which the several objects of this invention are achieved and which is well adapted to meet the conditions of practical use.

As various possible embodiments might be made of the above invention and as various changes might be made in the embodiment above set forth, it is to be understood that all matter herein set forth or shown in the accompanying drawings is to be interpreted as illustrative and not in a limiting sense.

Having thus described my invention, I claim as new and desire to secure by Letters Patent:—

1. In a device of the character described, in combination with the axle and leaf spring of a motor vehicle, a piston having a plunger secured to the vehicle frame, a cylinder in which said piston operates, said piston having one or more passages therein for the compression of the fluid in the cylinder therethrough, and deflecting means mounted above said piston and fixed relative thereto for preventing a sudden rush of the liquid through said passages.

2. In a device of the character described, in combination with the axle and leaf spring of a motor vehicle, a piston having a plunger pivoted to the vehicle frame, a cylinder in which said piston operates and means for removably securing the cylinder to said axle, said piston having one or more passages therein for the compression of the fluid in the cylinder therethrough and a deflecting member mounted above said piston in fixed relation thereto and extending beyond said passages for the purpose described and specified.

In testimony whereof I affix my signature.

ALBERT. A. MAILLETT.